R. C. MINER.
VEHICLE LOADING DEVICE.
APPLICATION FILED APR. 28, 1908. RENEWED FEB. 23, 1910.
954,198.
Patented Apr. 5, 1910.
4 SHEETS—SHEET 1.
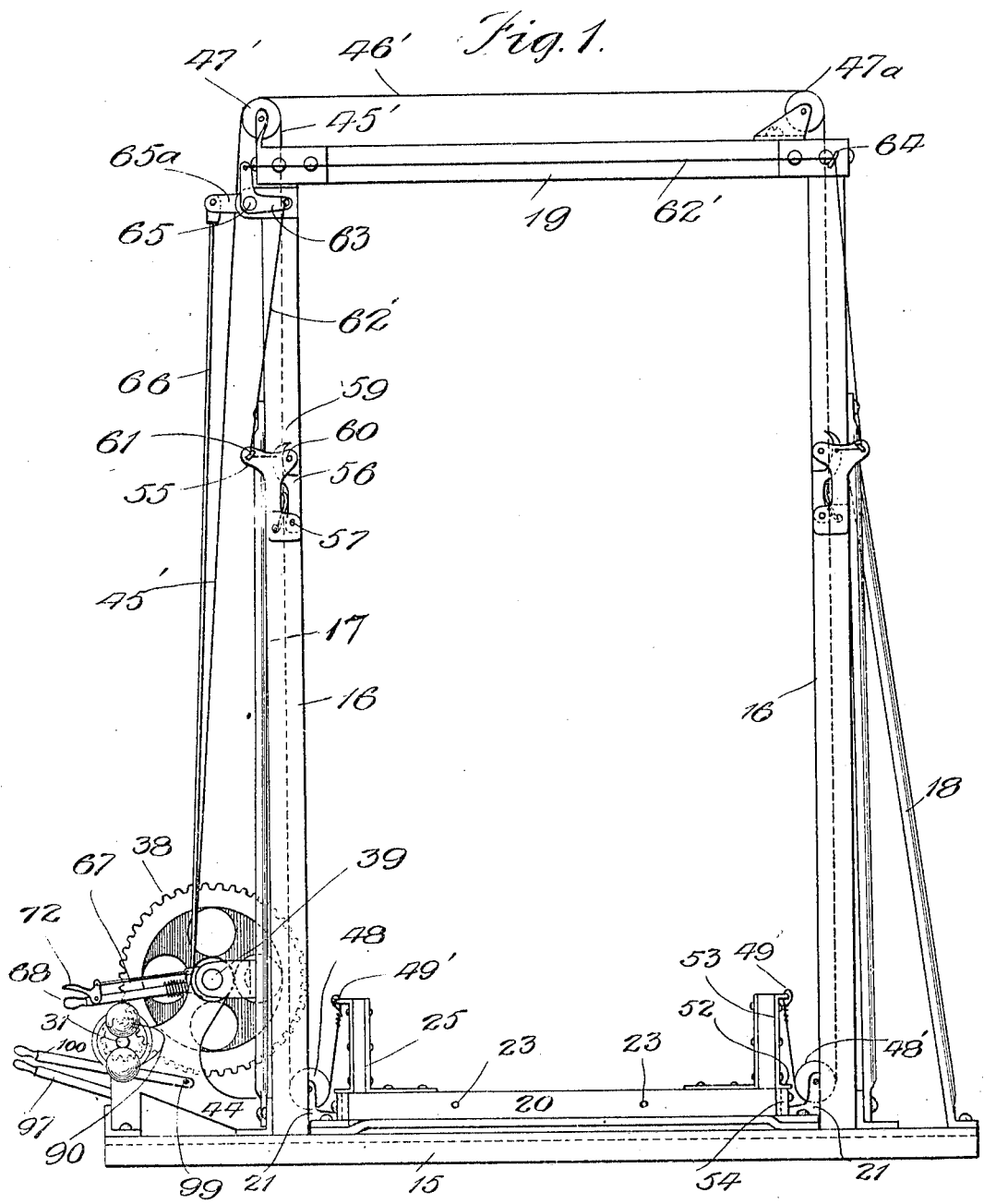

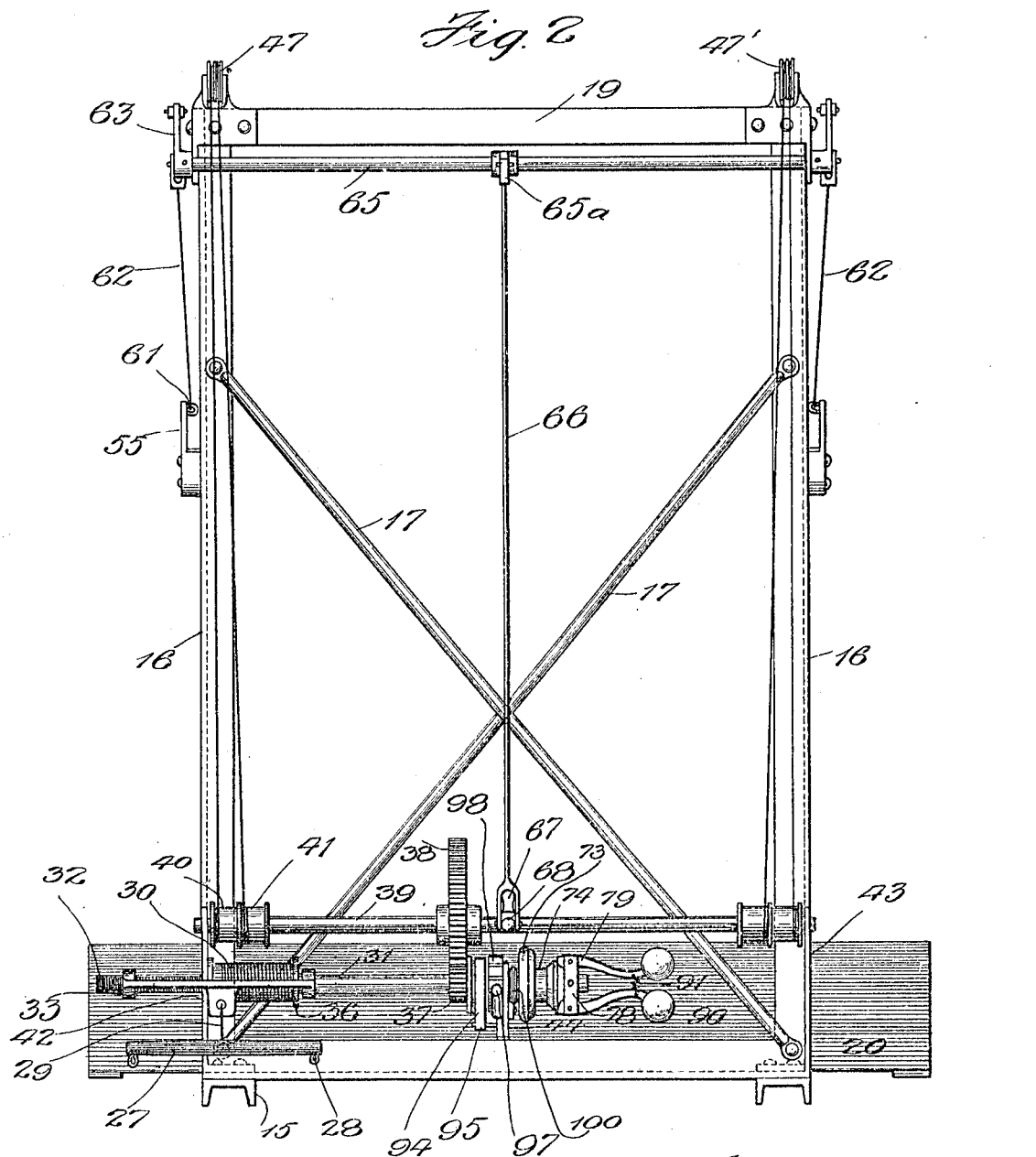

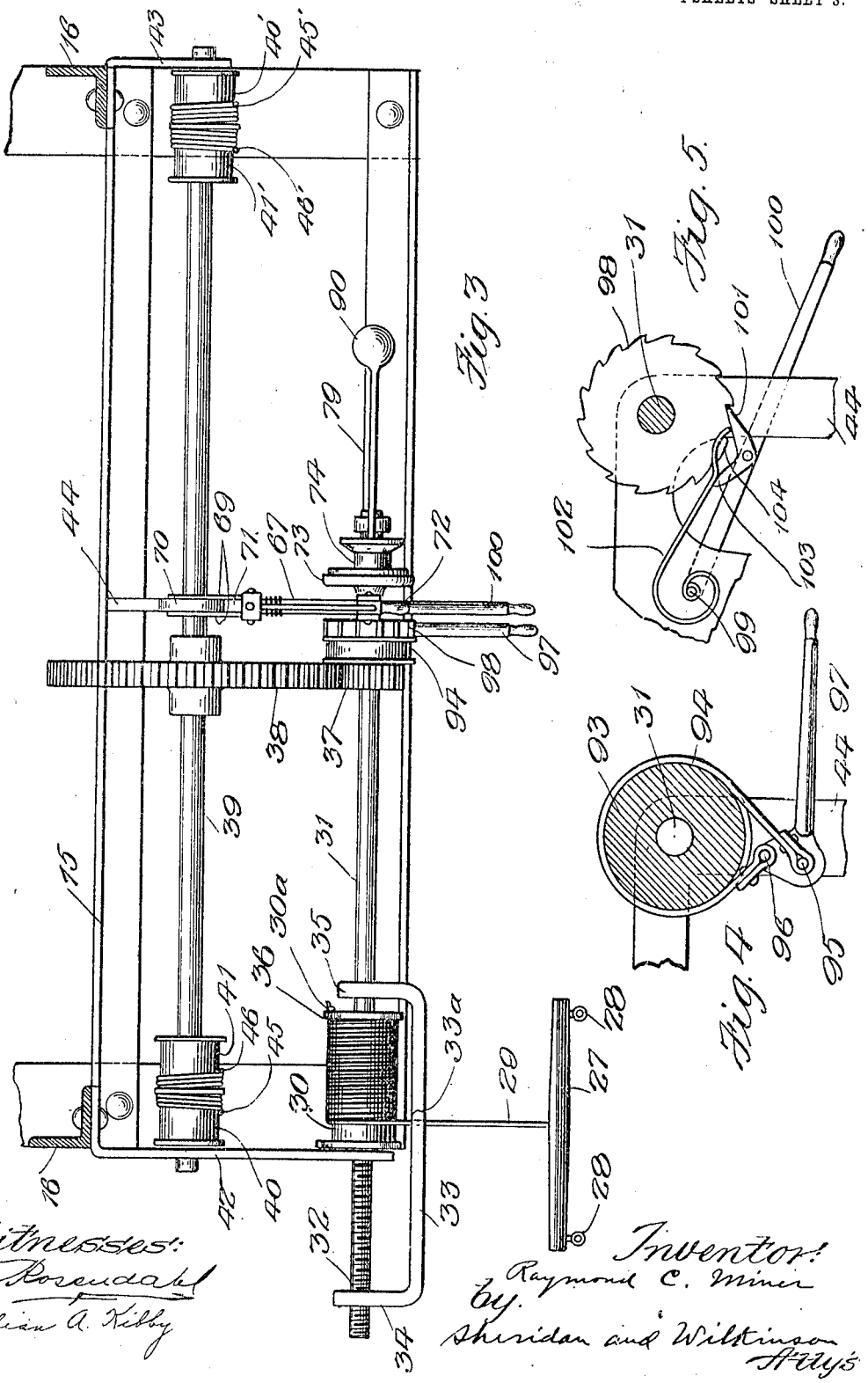

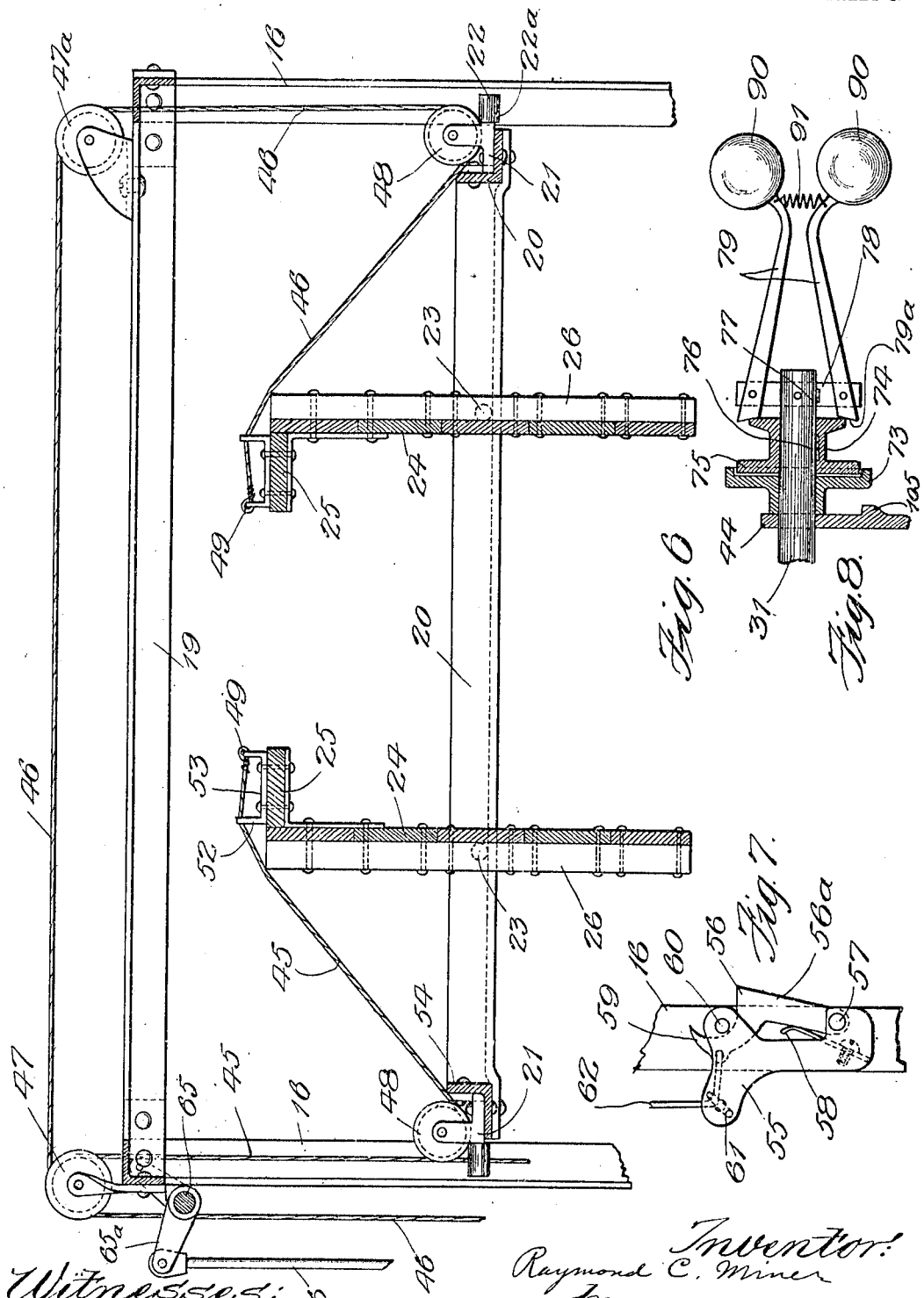

UNITED STATES PATENT OFFICE.

RAYMOND C. MINER, OF SIOUX FALLS, SOUTH DAKOTA, ASSIGNOR OF ONE-HALF TO OTTO W. FRANBERG, OF SIOUX FALLS, SOUTH DAKOTA.

VEHICLE-LOADING DEVICE.

954,198.   Specification of Letters Patent.   Patented Apr. 5, 1910.

Application filed April 28, 1908, Serial No. 429,599.   Renewed February 23, 1910.   Serial No. 545,500.

*To all whom it may concern:*

Be it known that I, RAYMOND C. MINER, a citizen of the United States, residing at Sioux Falls, in the county of Minnehaha and State of South Dakota, have invented certain new and useful Improvements in Vehicle-Loading Devices, of which the following is a specification.

The object of my invention is to provide a new and improved apparatus for loading vehicles.

More specifically my object is to construct a platform on which the material to be loaded may be piled, and to provide simple and effective apparatus for elevating the platform with its load and dumping the same into a wagon. This general object and various objects of detail in connection therewith will be made apparent in the following specification and claims, taken in connection with the accompanying drawings, in which—

Figure 1 is an end elevation of my device. Fig. 2 is a side elevation. Fig. 3 is a top plan view of a part thereof on an enlarged scale. Figs. 4 and 5 are elevations of details. Fig. 6 is a sectional view showing the upper part of the apparatus with the platform in dumping position. Fig. 7 is an elevation of a locking trigger to be described more fully hereafter, and Fig. 8 is a sectional view of a friction governor.

The framework of the machine comprises a rectangular frame 15 to be laid on the ground, with four corner uprights 16, diagonal braces 17 at the sides, other braces 18 at the end and a rectangular frame 19 joining the top ends of the posts 16. Lying across the bottom frame 15 between the pairs of posts 16 is a horizontal rectangular frame 20, which is capable of being raised as an elevator platform between the posts 16. This movable frame 20 is made of angle irons as shown clearly in Fig. 6. On a pair of opposite sides little brackets 21 are attached by means of rivets and from these, projections 22 extend having rollers 22ª thereon. These rollers are adapted to contact with the inner faces of the upright angle irons 16 and thus guide the platform frame 20. Within the rectangular frame 20 are two tilting platforms 24 each supported on sills 26 which are rotatably mounted on the pivot pins 23, the latter being supported on the end members of the frame 20. At their outer sides the platform members 24 have upturned edges 25.

Having described in general outline the structure of my device I will now proceed to describe the details of the operating mechanism.

A swingletree 27 is provided with hooks 28 at the end thereof to which a draft horse may be hitched. From this swingletree a rope 29 extends and is wrapped around the drum 30, which is fixed on the rotatable shaft 31. At its end this shaft 31 is screw-threaded, as indicated by the reference numeral 32, and a yoke 33 is provided having a guide hole through which the rope 29 passes. One end 34 of the yoke is screw-threaded and mounted on the threaded shaft 32. The other end 35 of the yoke embraces the shaft 31 and slides freely thereon. It will readily be seen that the rotation of the shaft 31 due to the winding or the unwinding of the rope 29 on the drum 30 will serve to reciprocate the yoke 33, and thus guide the said rope. The drum 30 has flanges at its ends and through one of these flanges 36 the extremity of the rope 29 passes and is knotted, as indicated by the reference numeral 30ª. The shaft 31 also carries a gear pinion 37 which engages a large gear wheel 38 on the parallel shaft 39. The latter shaft carries at one end two winding drums 40 and 41, and at the opposite end two corresponding drums 40' and 41'. Inasmuch as the latter two drums are exact counterparts of those previously mentioned, specific description will be given of only one set.

A bracket 42 extends out from the framework at one corner of the structure and supports the shafts 31 and 39. Another intermediate bracket 44 also has supports for these same shafts and the corner bracket 43 has a bearing for the shaft 39. The ropes 45 and 46 have an end of each attached to the respective drums 40 and 41 and said ropes are wound more or less around said drums. Thence these ropes pass upwardly over the double grooved pulley 47 at the top. From this point one rope 45 extends down under the pulley 48 which is supported by the bracket 21 on the frame 20. After passing under the said pulley 48 the end of the rope is attached at the point 49 to the brace 53 which is bolted or riveted to the side 25 of the tilting platform 24. The other rope 46 after passing across the double grooved top pulley 47 extends horizontally across the top of the structure, around the pulley 47ᵃ and thence downward under the pulley 48, and to the attachment point 49, the structure at this side corresponding to that on the opposite side which has already been described. The side braces 53 have their lower ends turned outwardly, as indicated by the reference numerals 52, the extremities being notched to serve as guides for the ropes 45 and 46. Moreover, these outwardly turned portions 52 resting on the flange 54 of the frame 20 serve as stops to prevent the platform members 24 from dumping outwardly.

On each one of the corner posts 16 there is mounted a catch, one of them being illustrated in Fig. 7. This comprises a bracket 55 spaced out a little from the post 16 and having a stop 56 pivoted at 57. This stop is held in the position shown in Fig. 7 by means of the spring 58. At its upper end is a hook 59, which by engagement with the pin 60 limits its movement. On one side the bracket carries a ring 61, and a rope 62 has one end attached to the hook 59 passing thence through said ring 61. As seen in Fig. 1 there is a bell-crank 63 mounted on the shaft 65. To one arm of this bell-crank the rope 62 which extends directly up from the stop 56 is attached. The rope 62′ from the corresponding stop on the other side of the frame passes through the eye 64 and across connecting to the other arm of the bell-crank 63. An arm 65ᵃ projects out from the shaft 65 and to this a long link 66 is attached. Below there is a lever 67 to which the lower end of the link 66 is fastened. This lever 67 has a handle 68 at its end, the opposite end having a fork 69, the members thereof pivotally engaging the shaft 39. Between the fork members 69 lies the bracket 44 which is modified to form a notched quadrant 70, which coacting with the locking pawl 71 on the lever 67 serves to hold said lever in desired position. The locking pawl 71 is controlled by the thumb piece 72.

At the extremity of the shaft 31 is a friction governor illustrated in Fig. 8. The socket 73 is fixed to the bracket 44 and the sleeve 74 is slidably mounted alongside the socket 73 upon the shaft 31. Rotation between these two members is prevented by means of the key and slot 76, 77. The governor balls 90 on the arms 79 are pivoted to the cross arm 78, which is fixed on the end of the shaft 31. These balls 90 are pulled together by the spring 91.

Alongside the gear pinion 37 and fixed on the shaft 31 is a friction drum 93. A flexible friction band 94 passes around this drum having one end secured to the pin 95 and the other end secured to the pin 96, the latter being mounted at one extremity of the bent arm lever 97. Thus a movement of the lever 97 serves to tighten the band 94 on the drum 93.

Attached to one side of the friction drum 93, and hence fixed on the shaft 31 is a ratchet wheel 98. A lever 100 is pivoted at 99 on the bracket 44 and this lever carries a pawl 101 adapted to co-act with the ratchet 98. A spring 102 having one end attached to the pivot 99 reaches across and presses against the end 103 of the ratchet member 101. Thus when the lever is in the position shown in full lines in Fig. 5 the effect of the spring 102 is to press the pawl 101 into the ratchet wheel 98. However, when the lever 100 is pushed down into the position shown in dotted lines in Fig. 5 the pawl 101 will strike against the bent end 104 of the spring 102 and this will serve as a stop to prevent the pawl 101 from being thrown over too far. The lever 100 is held in the position shown in full lines in Fig. 5 by being caught on the lug 105 (Fig. 8) on the bracket 44. When the lever 100 is to be depressed from its uppermost position it is first sprung to the right, thus clearing the said lug 105 and then it can be pushed down.

Having described the structure of my improved vehicle loading device I will now proceed to describe its operation.

When the parts are in position shown in Fig. 1 the material to be loaded may be piled on the platform members 24 within the frame 20, the sides 25 assisting to retain the load in place. This platform 24 being on the ground level such method of loading is practical and convenient. When it is desired to transfer the load from the platform 20—24 a horse is hitched to the swingletree 27 and driven along so as to unwind the rope 29 from the drum 30, thus rotating the latter and with it the shaft 31 and gear pinion 37. Thus the gear wheel 38 is caused to revolve rotating the shaft 39 and winding the ropes 45, 46 upon their respective drums 40, 41. These ropes passing downward over the pulleys 47 and 47ᵃ serve to pull the frame 20 up, the latter being guided by the rollers 22ᵃ co-acting with the corner posts 16. It is to be noted that the rope 45 or 46 at such time pulls up on the pulley 48 and down on the eye 49 to which the extremity of the rope is attached. Thus the toe 52 of the brace 53 is pulled down against the flange 54 of the angle-iron frame 20, these contacting members serving as stops to prevent further relative movement of the parts to which they are attached. All the time that the horse is pulling on the rope 29 the pawl 101 coacting with the ratchet wheel 98 is operating to prevent backward movement. At this time the stops or catches 56 on the corner posts 16 are each in the position shown in Fig. 7. Thus the ascending frame 20 strikes against the inclined surfaces 56ᵃ and pushes the stops 56 back; then after the frame gets higher the springs 58 return the stops 56 to the position shown in Fig. 7. The operator then stops the horse from pulling on the rope 29, and depresses the lever 97 so as to hold the shaft 31 against rotation, by means of the band and band wheel 94, 93. Thereafter he depresses the lever 100 so as to remove the pawl 101 from the ratchet wheel 98. Then by carefully raising the lever 97 he releases the pressure between the band 94 and band wheel 93 to such extent as to permit the platform 20—24 to descend. The said platform will thereupon descend until the frame 20 rests upon the catches 56. On further releasing the lever 97 the tension will be removed from the ropes 45 and 46. The meeting edges of the platform members 24 are purposely made heavier than the sides 25 and thus their weight together with the weight of the load which will be piled higher on the said meeting edges, will cause the device to dump, as illustrated in Fig. 6. A wagon having been driven under the platform before dumping, will receive the dumped load. Next the horse is started up, again unwinding the rope 29 from the drum 30. This will rewind the ropes 45, 46 and will tilt the platform members 24 back to horizontal position until the stops 52 strike the frame members 20. Further rotation of the platform members 24 being no longer possible the continued pull on the ropes 45, 46 will elevate the frame 20 away from the stops 56. After this elevation has gone a short distance the horse is stopped and unhitched from the swingletree 27, the parts being held by means of the pawl and ratchet 101, 98. Then the operator pulls down on the lever 67 which by means of the link 66, shaft 65 and ropes 62, 62' pulls the stops 56 back into the position shown in Fig. 1. Next he pushes down on the lever 97 tightening the friction band 94 on the band wheel 93, then withdraws the pawl 101 from the ratchet 98 by means of the lever 100 and finally permits the platform 20—24 to descend by gravity, controlling its descent by means of the band and band wheel 94, 93. If at any time the descent is too fast for safety the governor balls 90 fly out and the beveled ends 79ª of the arms 79 force the members 73 and 75 together, thus acting as a friction brake to check the speed of descent.

It will be observed that I have invented a simple and convenient device for elevating a burden from the ground level and thereafter dumping it into a wagon.

My apparatus is especially adapted to be used about a farm. It is always ready for use, it being simply necessary to attach a harnessed horse to the swingletree 27.

I claim:

1. A loading device comprising a frame, a platform, mechanism to raise the platform in the frame, means for applying power to the mechanism, a catch to hold the platform at a certain height, and means to automatically release the platform so that it will dump when it is allowed to rest on the catch.

2. A loading device comprising a horizontal rectangular frame, a tilting platform pivoted therein, vertical guiding members, means for elevating the frame and platform within said guiding members, stops on the guiding members to hold the horizontal frame at a certain height, and means to automatically release the tilting platform so that it will dump a load thereon when the said horizontal frame is lowered on said stops.

3. A loading device comprising a horizontal platform, a frame in which said platform may be moved in a vertical direction, ropes passing from the corners of the platform over pulleys on the upper part of the frame, winding drums on a single shaft for said ropes, another shaft parallel to the aforementioned shaft with a winding drum thereon, gearing connecting said shafts, a rope about the last-named winding drum with a swingletree attached to its extremity, a brake on the same shaft with the last named winding drum, and a centrifugal governor to control the brake.

4. A loading device comprising a stationary frame with vertical guides, a horizontal rectangular frame with rollers engaging the guides, opposed platforms pivoted within the horizontal frame, said platforms having their inner edges weighted, pulleys on the horizontal frame, ropes passing from the outer edges of the tilting platforms under said pulleys, and thence up over pulleys at the top of the upright guides, co-acting stops on the tilting platforms and the horizontal frame, and means for raising or lowering the said horizontal frame by the said ropes.

5. A loading device comprising a frame, a loading platform adapted to be raised or lowered therein, a horizontal shaft mounted in brackets near the base of the said frame, a draft rope wound upon said shaft, a ratchet wheel on said shaft and a co-acting pawl on one of the brackets, a band wheel on said shaft and a band brake therefor, a lever for disengaging the said pawl from the ratchet, another lever for controlling the said band brake, and mechanism extending from the said shaft to the platform whereby the rotation of the shaft will raise the platform.

6. A loading device comprising a frame with vertical uprights, a loading platform with guides engaging said uprights, a bracket on each upright, a catch within the bracket having a beveled face toward the upwardly ascending platform and a square shoulder above, a spring to hold the catch in engagement with the platform, and means adapted to be actuated by an operator for withdrawing all the catches simultaneously when desired.

7. A loading device comprising a frame having upright guides, a platform with rollers engaging said guides, two parallel shafts supported in brackets beside the frame at its base, a gear wheel on one shaft and an intermeshing gear pinion on the other shaft, winding drums on both shafts, ropes passing from the platform over pulleys at the top to the said drums on one shaft, and a draft rope wound about the drum on the other shaft.

8. A loading device comprising a main framework, a horizontal rectangular frame with guides engaging said main framework, pivoted dumping platforms mounted in the horizontal frame, said platforms having stops on their outer edges which engage the horizontal frame members so as to prevent them from tilting outwardly, lifting cables attached to the outer edges of the tilting platforms and passing under adjacent pulleys on the horizontal frame, and means for actuating said cables.

9. A loading device comprising a guiding framework, and platforms adapted to be raised or lowered therein, cables for raising or lowering the platform, means for actuating said cables comprising a rotatable shaft, a ratchet wheel on said shaft, and a co-acting pawl pivoted on a hand lever whereby the pawl may be disengaged from the ratchet wheel when desired.

In testimony whereof, I have subscribed my name.

RAYMOND C. MINER.

Witnesses:
E. J. ANDERSON,
B. C. MATTHEWS.